United States Patent
Farkash et al.

(10) Patent No.: US 10,754,939 B2
(45) Date of Patent: Aug. 25, 2020

(54) SYSTEM AND METHOD FOR CONTINUOUS AUTHENTICATION USING AUGMENTED REALITY AND THREE DIMENSIONAL OBJECT RECOGNITION

(71) Applicant: International Business Machines Corporation, Armonk, NY (US)

(72) Inventors: Ariel Farkash, Shimshit (IL); Eitan Hadar, Nesher (IL); Amnon Ribak, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 103 days.

(21) Appl. No.: 15/632,427

(22) Filed: Jun. 26, 2017

(65) Prior Publication Data

US 2018/0373858 A1 Dec. 27, 2018

(51) Int. Cl.
*G06F 21/36* (2013.01)
*G06F 21/60* (2013.01)
(Continued)

(52) U.S. Cl.
CPC .............. *G06F 21/36* (2013.01); *G06F 21/31* (2013.01); *G06F 21/44* (2013.01); *G06F 21/60* (2013.01);
(Continued)

(58) Field of Classification Search
None
See application file for complete search history.

(56) References Cited

U.S. PATENT DOCUMENTS

| 6,914,517 B2 | 7/2005 | Kinsella |
| 8,886,942 B2 | 11/2014 | Forte et al. |

(Continued)

FOREIGN PATENT DOCUMENTS

| EP | 2887253 | 6/2015 |
| WO | 2015085434 | 6/2015 |
| WO | 2016207899 | 12/2016 |

OTHER PUBLICATIONS

Gaebel et al., Looks Good to Me: Authentication for Augmented Reality, 2016, TrustEd'16, Oct. 28, 2016,pp. 57-67, Vienna, Austria (Year: 2016).*

(Continued)

*Primary Examiner* — Luu T Pham
*Assistant Examiner* — Edward X Long
(74) *Attorney, Agent, or Firm* — Roy Melzer

(57) ABSTRACT

A method for authentication based on image location and image analysis, comprises: identifying a request of a user to access a resource; determining a location and view point of a device; selecting, based on the location and the view point, at least one three-dimensional model, geometrically mapping objects around the location; capturing an image at the location by a camera of the device; presenting the image on a display of the device; identifying in the at least one first image a set of objects corresponding to a plurality of user selections made by the user with reference to the image when the image is presented on the display; performing a match between the set of objects and a predefined set of objects in the three-dimensional model using the three-dimensional model and the view point; and authenticating the request based on an outcome of the match.

15 Claims, 6 Drawing Sheets

(51) Int. Cl.

| | |
|---|---|
| *H04L 9/32* | (2006.01) |
| *H04W 4/02* | (2018.01) |
| *G06F 21/31* | (2013.01) |
| *H04W 12/06* | (2009.01) |
| *G06K 9/46* | (2006.01) |
| *G06F 21/44* | (2013.01) |
| *H04L 29/06* | (2006.01) |
| *G09C 5/00* | (2006.01) |
| *G06K 9/00* | (2006.01) |
| *H04W 12/00* | (2009.01) |

(52) U.S. Cl.
CPC ..... *G06K 9/00208* (2013.01); *G06K 9/00671* (2013.01); *G06K 9/46* (2013.01); *G09C 5/00* (2013.01); *H04L 9/3226* (2013.01); *H04L 63/10* (2013.01); *H04W 4/02* (2013.01); *H04W 12/00503* (2019.01); *H04W 12/06* (2013.01); *G06F 2221/2111* (2013.01); *H04L 2209/80* (2013.01)

(56) References Cited

U.S. PATENT DOCUMENTS

| | | |
|---|---|---|
| 9,218,480 B2 | 12/2015 | Fakhrai et al. |
| 9,305,298 B2 | 4/2016 | Wilson |
| 9,317,669 B1 | 4/2016 | Gray |
| 9,342,677 B2 | 5/2016 | Ali et al. |
| 2011/0061100 A1 | 3/2011 | Mattila et al. |
| 2014/0013422 A1 | 1/2014 | Janus et al. |
| 2014/0096215 A1 | 4/2014 | Hessler |
| 2015/0026785 A1 | 1/2015 | Soon-Shiong |
| 2015/0037781 A1* | 2/2015 | Breed ................ G09B 7/00 434/362 |
| 2015/0193651 A1* | 7/2015 | Gleim ............ G06K 9/00295 382/118 |
| 2015/0242597 A1* | 8/2015 | Danciu ............... G06F 21/10 726/30 |
| 2015/0302571 A1 | 10/2015 | Lambert |
| 2016/0345176 A1 | 11/2016 | DeWitt et al. |
| 2018/0158060 A1* | 6/2018 | Adams ............ G06Q 20/409 |
| 2018/0351962 A1* | 12/2018 | Kulkarni .......... H04L 63/105 |

OTHER PUBLICATIONS

Murphy et al., An Augmented Reality View on Mirror World Content, with Image Space, 2010, IEEE Virtual Reality , pp. 291-292 (Year: 2010).*

Kurkovsky et al., "Approaches and Issues in Location-Aware Continuous Authentication", 2010 13th IEEE International Conference on Computational Science and Engineering, Dec. 2010, pp. 279-283.

* cited by examiner

SYSTEM AND METHOD FOR CONTINUOUS AUTHENTICATION USING AUGMENTED REALITY AND THREE DIMENSIONAL OBJECT RECOGNITION

BACKGROUND

The present invention, in some embodiments thereof, relates to an authentication system, and more specifically, but not exclusively, to a system for continuous authentication and authorization.

As used herein, the term "computer-controlled system" means a system having computer-controlled access control and the term "computer-controlled object" means an object having computer-controlled access control.

There may be a need to restrict access to a restricted resource such as a computer-controlled system or a digital artefact, for example a software program, a document file, or a video file or other media file, and allow access only from within one or more secure locations, even for persons authorized to access the computer-controlled system or digital artefact. For example, restriction may be limited to be only from one or more rooms within the premises of an enterprise. Other examples of a secure location are a deal room, a war room and a safe room in a bank. Commonly used methods include restricting access to a predefined Local Area Network (LAN), identified by an Internet Protocol (IP) address range of the LAN.

In addition to initial authentication and authorization, there may be a need to continuously verify a person accessing a restricted resource is in the secure location all the while the restricted resource is accessed.

Digital combination locks are a commonly used way of controlling access to a location, an object or a digital artefact. For example, screen locking of a mobile device may comprise a digital combination lock. A typical digital combination lock comprises a code sequence. Some code sequences comprise a plurality of alphanumeric characters, for example a password and a Personal Identification Number (PIN); some other code sequences comprise a plurality of gestures, for example a pattern lock on a mobile device. In some cases, a code sequence for unlocking a digital combination lock is personal, that is a certain user is associated with a certain code sequence.

SUMMARY

It is an object of the present invention to provide a system and method for authenticating a user at a location using augmented reality and three-dimensional object recognition.

The foregoing and other objects are achieved by the features of the independent claims. Further implementation forms are apparent from the dependent claims, the description and the figures.

According to a first aspect of the invention, a method for authentication based on image location and image analysis comprises: identifying a request of a user to access a resource; determining a location and view point of a mobile client device; selecting, based on the location and the view point, at least one three-dimensional model, geometrically mapping a plurality of objects around the location; capturing at least one first image at the location by a camera of the mobile client device; presenting the at least one first image on a display of the mobile client device; identifying in said at least one first image a set of objects corresponding to a plurality of user selections made by the user with reference to the at least one first image when the at least one first image is presented on the display; performing a match between the set of objects and a predefined set of objects in the at least one three-dimensional model using the at least one three-dimensional model and the view point; and authenticating the request based on an outcome of the match.

According to a second aspect of the invention, a system for continuous authentication, comprises at least one hardware processor configured to: identify a request of a user to access a resource; determine a location and view point of a mobile client device; select, based on the location and the view point, at least one three-dimensional model, geometrically mapping a plurality of objects around the location; capture at least one first image at the location by a camera; present the image on a display; identify in the at least one first image a set of objects corresponding to a plurality of user selections made by the user with reference to the at least one first image when the at least one first image is presented on the display; performing a match between the set of objects and a predefined set of objects in the three-dimensional model using the three-dimensional model and the view point; and authenticating the request based on an outcome of the match.

According to a third aspect of the invention, a method for producing a security sequence comprises: capturing at least one first image by a camera; creating at least one three-dimensional model from the at least one first image, geometrically mapping a plurality of objects; receiving a user selection of a set of objects of the plurality of objects; and storing the user selection.

With reference to the first and second aspects, in a first possible implementation of the first and second aspects of present invention, the location is with respect to a reference object or with respect to a world coordinate system. Defining a location with respect to a world coordinate system allows defining an absolute location. Defining a location with respect to a reference object allows identifying a location by the objects in the location, useful when there is no access to a world coordinate system (for example, where Global Positioning System is not available).

With reference to the first and second aspects, in a second possible implementation of the first and second aspects of present invention, the predefined set of objects is a predefined sequence of objects, the set of objects is a sequence of objects, and the match comprises matching the sequence of objects and the predefined sequence of objects. Optionally, the user making the plurality of user selections comprises: instructing the user to select a second predefined object; receiving a user selection of the second predefined object; and instructing the user to select a third predefined object, upon confirmation of user selection of the second predefined object. When the predefined sequence is a secret known only to the user, matching objects in a predefined sequence provides greater security than just selecting the objects. Optionally, using a sequence serves to prove the presence of the user in the location. Optionally, the system instructs the user with hints only familiar to the user.

With reference to the first and second aspects, in a third possible implementation of the first and second aspects of present invention, the plurality of user selections are by receiving haptic input from the user via a tactile sensor installed over the display or by focusing the camera on at least one of said set of objects. Using a touch screen or focusing a camera are convenient ways for a user to select objects.

With reference to the first and second aspects, in a fourth possible implementation of the first and second aspects of present invention, the predefined set of objects comprises at least one location object characteristic of the location or at least one user object characteristic of the user or at least one of the predefined set of objects at a predefined orientation with reference to the camera. An object characteristic of the location is used to establish the location. An object characteristic of the user is used to establish the identity of the user. A predefined orientation with reference to the camera may be part of a secret the user knows.

With reference to the first and second aspects, in a fifth possible implementation of the first and second aspects of present invention, the camera is electrically connected to the at least one hardware processor or is connected to the at least one hardware processor via a first digital communication network. This allows using cameras embedded in the client device and separately connected cameras.

With reference to the first and second aspects, in a sixth possible implementation of the first and second aspects of present invention, the display is electrically connected to the at least one hardware processor. Using such a display increases security compared to sending over a network.

With reference to the first and second aspects, in a seventh possible implementation of the first and second aspects of present invention, the system further comprises a controllable mount having a movable member for mounting a camera or an object. Using a controllable mount allows the system to control movement of the mount in real time and prevent replaying a recording.

With reference to the first and second aspects, in an eighth possible implementation of the first and second aspects of present invention, the system further comprises a non-volatile digital storage, connected to the at least one hardware processor, the non-volatile digital storage is electrically connected to the at least one hardware processor or is connected to the at least one hardware processor via a second digital communication network. Using a non-volatile digital storage allows storing three-dimensional models and authentication sequences for future reference.

With reference to the first and second aspects, or the fifth, sixth, seventh and eighth implementations, in a ninth possible implementation of the first and second aspects of present invention the method further comprises performing continuous authentication comprising: identifying at least one additional request of the user to access the resource; capturing at least one additional image at the location by the camera; identifying at least one additional object in the at least one additional image; performing an additional match between the at least one additional object and the predefined set of objects using the at least one three-dimensional model; and authenticating the at least one additional request based on an outcome of said additional match. Optionally, the continuous authentication is performed periodically. Optionally, the method comprises further instructing moving the camera or moving the at least one additional object to capture the at least one additional image. Optionally, the camera or the at least one additional object is mounted on a movable member of a controllable mount, instructing moving the camera or moving the at least one additional object comprises instructing the controllable mount to move the movable member to position the camera or the at least one additional object. Optionally, instructing moving the camera or moving the at least one additional object is by instructing the user to manually move the camera or the at least one additional object or by changing an orientation of the at least one additional object relative to the camera or by changing a position of the at least one additional object with relation to the location. Performing continuous authentication allows revoking access to a restricted resource in the authorized user is no longer identified or if the authorized user is no longer at an authorized location. Moving objects or changing camera position provides a means for ensuring in real time the images are authentic and not a replay of a previous authorization sequence.

With reference to the third aspect, in a first possible implementation of the third aspect of the present invention, the at least one first image is captured at a location; and the at least one three-dimensional model geometrically maps the plurality of objects around at least one of: the location and at a relative positioning of the plurality of objects around the location. Optionally, the set of selected objects is a sequence of selected objects, and the user selection comprises: capturing at least one second image by the camera; matching a first object in the at least one second image with at least one of the plurality of objects to produce a first selected object; capturing at least one third image by the camera; and matching a second object in the at least one third image with at least one second of the plurality of objects to produce a second selected object. The user can create an authentication sequence by selecting one or more objects at a location, connecting the user to the location. A sequence is more restricting than an unordered set, making the authentication more secure. Using a camera to create the sequence is a convenient method for quick creation of a security sequence.

With reference to the third aspect, in a second possible implementation of the third aspect of the present invention, the resource is at least one digital resource, or is a computer-controlled device or system. Digital resources and computer controlled devices and systems are examples of resources requiring access control.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DETAILED DESCRIPTION

Figure 1:
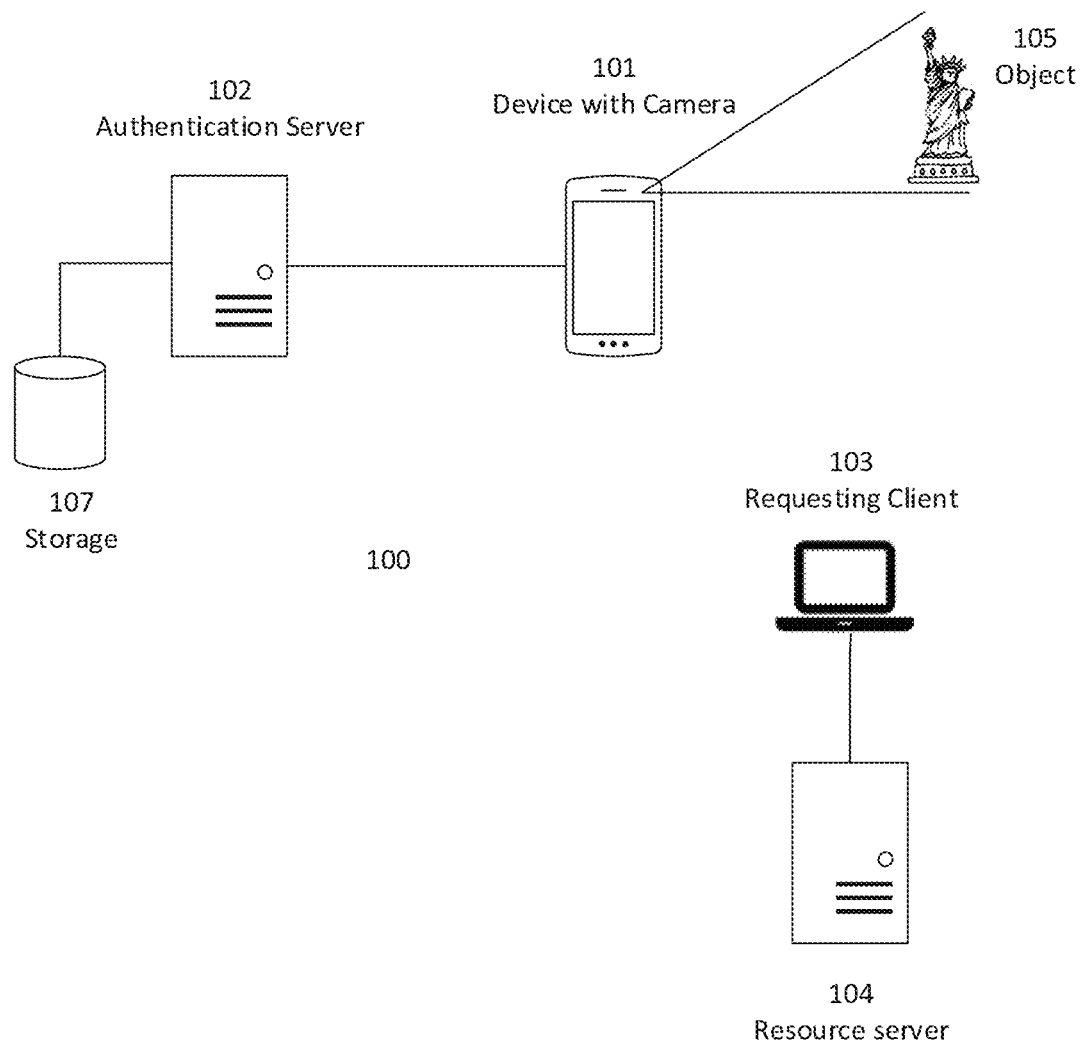
FIG. 1 is a schematic block diagram of an exemplary system according to some embodiments of the present invention.

The present invention, in some embodiments thereof, relates to an authentication system, and more specifically, but not exclusively, to a system for continuous authentication and authorization.

Data leaks may result from a digital artefact being opened, sent, copied etc. in environments that are not safe, and where unauthorized persons may access the content of the digital artefact by observation means including watching, eavesdropping, and network sniffing. Likelihood of such observation means being applied in order to gain unauthorized access to a restricted resource increase in a home environment and in a public location. Examples of a public location are a restaurant or a café, a public transportation vehicle such as a train or an airplane, and a public transportation depot such as a train station or an airport.

In a computer-controlled system, access rights to a resource, according to some security policies, may include a location based rule, such that the resource may be accessed only from one or more predefined secure locations in order to prevent a data leak. Enforcing such a security police requires authentication driven by the secure location. It may be that there is a need to conceal the fact that a certain location is a secure location and location based authorization must be done without modifying the secure location.

In addition, there is a growing need to strengthen user authentication beyond a simple password. Sometimes this is achieved using biometric means such as fingerprint recognition, voice recognition, face recognition and retina recognition. Authentication using biometric means has known limitations. For example, voice recognition is sensitive to background noise; some facial features are prone to changes due to age or are affected by lighting; a retina can be difficult to capture, and fingerprints can change, for example due to exposure to water, detergents and other chemicals.

Augmented reality is an integration of digital information with a person's physical environment in real time. Unlike virtual reality, which creates a totally artificial environment, augmented reality uses the existing physical environment and overlays new information on top of it. The new information may be at least one of computer-generated sensory input, for example sound, video, graphics and global positioning system (GPS) coordinates. The new information may be a computer-generated mapping of the environment. A person may interact with the overlay information, for example see the graphics integrated with an image of the physical environment, or indicate a selection of a feature in the computer-generated mapping of the environment.

The present invention, in some embodiments thereof, uses augmented reality and three-dimensional object recognition to authenticate a person at a location and authorize access to a restricted resource. A restricted resource may be a digital artefact (also referred to as a digital resource). A restricted resource may be an object, for example an interface of an electronic device and a lock to a room or a car.

In some embodiments of the present invention, interaction of a user with a set of objects at a location and identifying the set of objects at the location is used to authorize access of the user to a restricted resource. Identification is by capturing a plurality of images at the location using a camera, and matching, by an authentication server comprising one or more hardware processors, one or more objects in the plurality of images with a predefined set of objects in a predefined three-dimensional model geometrically mapping a plurality of objects around the location. Optionally, the plurality of objects around the location comprises one or more objects characteristic of the location. Examples of an object characteristic of the location are a wall decoration, a statue, a sign, an item of furniture, a light fixture and an architectural feature such as a window or a door frame. Identifying an object characteristic of the location in at least one of the plurality of images serves as proof that the person in possession of the camera is at the location. Optionally, the plurality of objects around the location comprises one or more objects characteristic of the user. Examples of an object characteristic of the user are a gadget, a desk toy, an identification document, an item of clothing, a piece of jewelry and a body marking such as a tattoo or a birthmark. Identifying at the location, in at least one of the plurality of images, an object characteristic of the user, serves as proof that the user is indeed at the location. In some embodiments the set of objects is a sequence of objects, having a predefined order. Optionally, the predefined set of objects comprises one or more features of one of the set of objects, for example a particular corner of a square table and another particular corner of the square table, or a top shelf of a bookcase, a middle shelf of a bookcase and a bottom shelf of a bookcase. Optionally, the predefined set of objects comprises one or more different orientations of one of the set of objects, for example a top view and a side view of an identified box. Optionally, the predefined set of objects comprises one or more different states of one of the set of objects, for example an identified pair of glasses folded and unfolded, or an identified box open and closed. The predefined order is typically known only to the user, thus identifying a set of objects in a predefine order reduces the probability of an unauthorized user succeeding at gaining access to the restricted resource. Using augmented reality, for example by overlaying a computer-generated mapping of the environment over the plurality of images, allows a user to interact with the plurality of images, for example to select the set of objects by indicating a selection from some objects in the plurality of images, recognized using three-dimensional object recognition. Three-dimensional object recognition typically involves recognizing and determining the pose of a three-dimensional object in a photograph or image. Some three-dimensional object recognition methods are based on pattern recognition. Some three-dimensional object recognition methods use a feature-based geometric approach.

Each of a plurality of users may have a different sequence of objects for authorization. Using a plurality of images capturing some objects at the location allows creating location specific access rules that are non-intrusive to the location. Creating multiple different sequences of objects is possible without the need to change anything in the layout of objects at the location.

In addition, there is a need for continuous authentication of a user at a location. For example, there may be a need to deny previously granted access to a restricted resource from a secure location once the user is no longer at the secure location. To do so, in some embodiments the present invention uses a continuous sequence of images captured at the location. Optionally, the sequence of images is a video stream of images. Optionally, the sequence of images is a sequence of individual images. The authentication server continuously matches one or more objects in an image of the sequence of images to the predefined set of objects in the predefined three-dimensional model. The outcome of the match is used to determine authentication of the user at the location. Continuous matching of objects from a sequence of images allows revoking access to the restricted resource on the fly.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing.

Computer readable program instructions described herein can be downloaded to respective computing/processing devices from a computer readable storage medium or to an external computer or external storage device via a network, for example, the Internet, a local area network, a wide area network and/or a wireless network.

The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference is now made to FIG. 1, showing a schematic block diagram of an exemplary system 100 according to some embodiments of the present invention. In such embodiments, a device 101 having a camera at a location is connected to an authentication server 102. Authentication server 102 comprises one or more hardware processors. Optionally, device 101 is a user's mobile device having a built in camera, such as a mobile phone, a wearable device or a tablet computer. Optionally, device 101 is a digital camera. Optionally, device 101 is a computer having a connected camera. Device 101 may be connected to authentication server 102 via a digital communication network, such as a LAN or a Wide Area Network (WAN). Optionally, device 101 may be electrically connected to authentication server 102. In embodiments where device 101 is a computer having a connected camera, the camera is optionally connected to the computer via a digital network connection such as a LAN or a WAN. Optionally, the camera is electrically connected to the computer. In some embodiments, the camera of device 101 is used to capture one or more images at a location, including an image of an object 105 at the location. Optionally object 105 is an object characteristic of the location. Optionally, object 105 is an object characteristic of the user. Optionally, the camera captures the one or more images using a predefined image filter. Optionally, the one or more images are displayed on a display. In some embodiments the display is a display of device 101. Optionally the display is connected to device 101 via a digital network connection such as a LAN or a WAN. Optionally, the display is electrically connected to device 101. Optionally device 101 comprises one or more hardware processors, executing code configured to perform augmented reality functionality and three-dimensional object recognition. Authentication server 102 may send device 101 a three dimensional model geometrically mapping a plurality of objects around the location. Optionally, the user interacts with device 101 to select a set of objects captured in the one or more images. Optionally, the user interaction comprises selecting a filter for use while capturing one or more of the set of images. Optionally, a tactile sensor is installed over the display. An example of a tactile sensor installed over the display is a touch screen of the device. The device may send information about the selected set of objects to authentication server 103; authentication server 103 may matches the selected set of objects to a predefined set of objects in the three-dimensional model of the location. Optionally, device 101 identifies the set of selected objects and matches the selected set of objects to the predefined set of objects in the three-dimensional model of the location.

In some embodiments a non-volatile digital storage 107 is connected to authentication server 102, for storing one or more three-dimensional models having one or more predefined sets of objects. Storage 107 may be electrically connected to authentication server 102. Storage 107 may be connected to authentication server 102 via a digital network connection such as a LAN or a WAN.

In some embodiments, successfully matching the selected set of objects to the predefine set of objects results in authentication server 102 sending an access key to device 101, for the user to use in order to gain access to a restricted resource using requesting client 103. Upon inputting the access key into requesting client 103, requesting client 103 may be granted access to a restricted resource provided by resource server 104. Optionally, resource server 104 is connected to resource client 103 electrically or via a digital connection network such as a LAN or a WAN.

To authenticate a user using augmented reality and three-dimensional object recognition, in some embodiments of the present invention system 100 executes the following method.

Figure 2:
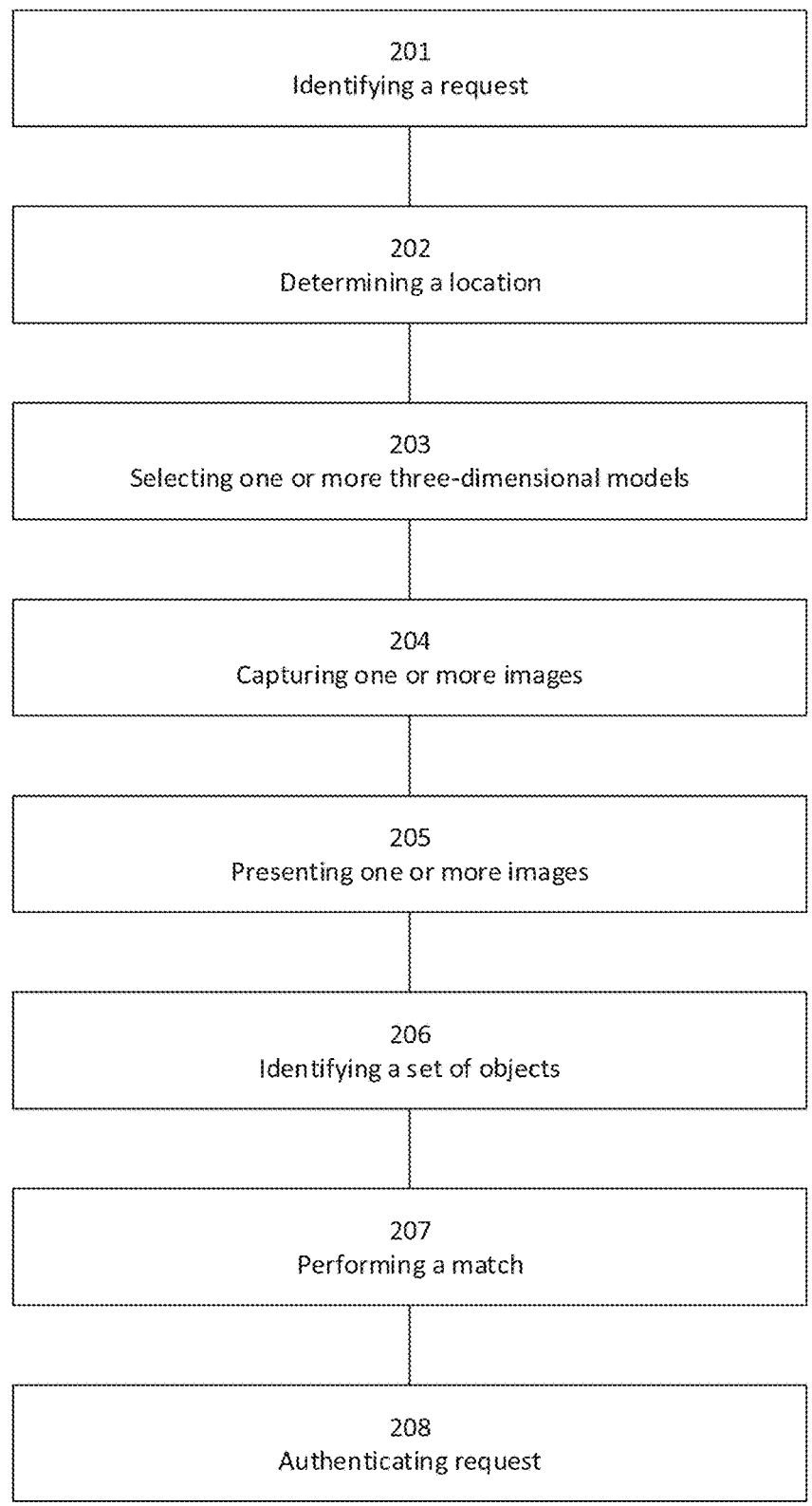
FIG. 2 is a flowchart schematically representing an optional flow of operations for authenticating a request, according to some embodiments of the present invention.

Reference is now also made to FIG. 2, showing a flowchart schematically representing an optional flow of operations 200 for authenticating a request, according to some embodiments of the present invention. In such embodiments, the one or more hardware processor identifies 201 a request of the user to access the restricted resource. Optionally, the restricted resource is a digital resource. Optionally, the restricted resource is a computer-controlled device or system. Optionally, the computer-controlled device is a lock, locking an object, such as a cabinet, or a location, such as a room. The one or more hardware processor may be the authentication server. In 202, the one or more hardware processor determines a location of a client device. Optionally, the client device is a mobile device. Optionally, the location is a geographical location identified by coordinates in a world coordinate system, for example GPS coordinates. Optionally, the location is determined according to GPS coordinates from a GPS application executed by the client device. Optionally, the location is input into the client device by the user, for example by selecting one location from a list of possible locations. In some embodiments the location is a vicinity of a reference object. For example, in embodiments where the invention is used to restrict access to a vehicle, the location may be the vicinity of the vehicle, for at a distance of less than 1 meter from the vehicle. Now, in 203, the one or more hardware processor selects, based on the location, one or more three-dimensional models. The three-dimensional model geometrically maps a plurality of objects around the location, and a predefined set of objects defined in the three-dimensional model. For example, in embodiments where the location is a room, the three-dimensional model may map a plurality of objects located in the room such as one or more pieces of furniture, one or more wall hangings, one or more light fixtures etc. Optionally, in embodiments where the location is a reference object, the three-dimensional model may map the reference object from a plurality of viewpoints, focusing on a plurality of features of the reference object. For example, when the reference object is a car, the three dimensional model may map one or more of: a plurality of view of the entire car, a plurality partial views of the car, one or more hubcaps, one or more lights, a grill, a badge and an emblem. Optionally, the predefined set of objects comprises one or more objects characteristic of the location, for example a wall hanging in a room or a badge of a car. Optionally, the predefined set of objects comprises one or more objects characteristic of the user, for example a gadget possessed by the user. Optionally, the predefined set of objects comprises one or more objects characteristic of the user at a predefined location in the space of the location. Optionally, one or more of the objects in the predefined set of objects is at a predefined orientation between the object and the camera. For example, when the object is a gadget, the predefined set of objects may comprise a predefined side of the object. In addition, the predefined set of objects may comprise the object at another predefine orientation between the object and the camera, for example another predefined side of the object. Optionally, two or more of the objects in the predefined set of objects are one object at two or more predefined locations in the space of the location.

In 204, the camera of the client device captures one or more images at the location. In some client devices that are mobile devices the camera is at the back of the mobile device. In other client devices that are mobile devices the camera is at the front of the mobile device. When the client device is smart glasses, capturing an image at the location is by looking at an object at the location through the lenses of the smart glasses. In 205 the one or more images are optionally displayed on a display of the client device. Optionally, one or more objects are marked on the displayed one or more images, for example by a layer of graphics augmenting the displayed one or more images.

Now, in 206, a set of objects is optionally identified according to a plurality of user selections made by the user in reference to the displayed one or more images. In some embodiments of the invention, the client device has a tactile sensor installed over the client device's display and aligned with a computer-generated mapping of the location augmenting the one or more images. For example, a touch screen over a display of a mobile device. In such embodiments, a user selection is by touching the tactile sensor, producing a haptic input to the one or more hardware processor; the one or more hardware processor identifies an object according to the alignment of the computer-generated mapping with the tactile sensor. In embodiments having a layer of graphics augmenting the displayed one or more images, the graphics may assist the user selection by indicating possible candidate objects for selection. In other embodiments, a user selection is by pointing the camera at an object and focusing the camera on the object. Optionally, the user selects an object by focusing the camera on a predefined feature of the object, for example a badge of a car or a predefined side of a gadget. Optionally, the one or more hardware processors use three-dimensional object recognition to identify an object in the one or more images.

Now, in 207, the one or more hardware processor performs a match between the identified set of objects and the predefined set of objects mapped by the three-dimensional model, and in 208 the request is authenticated based on an outcome of the match. In some embodiments the predefined set of objects is a secret known to the user. In other embodiments, the user is instructed by the client device to select the set of objects.

Optionally, the predefined set of objects is a sequence of objects and authorization is subject to making the plurality of user selections in a predefined order. Optionally, authorization is subject to the user selecting a predefined object at one or more locations within the space of the location, in a predefined order. Optionally, the user is instructed to select one object at a time; the client device instructs the user to select one object after confirming a user selection of another object. Optionally, the client device instructs the user by providing one or more hints to the one object.

In some embodiments the present invention is used for continuous authentication of the user at the location. To continually authenticate the user and the location, in some embodiments the system uses the following method.

Figure 3:
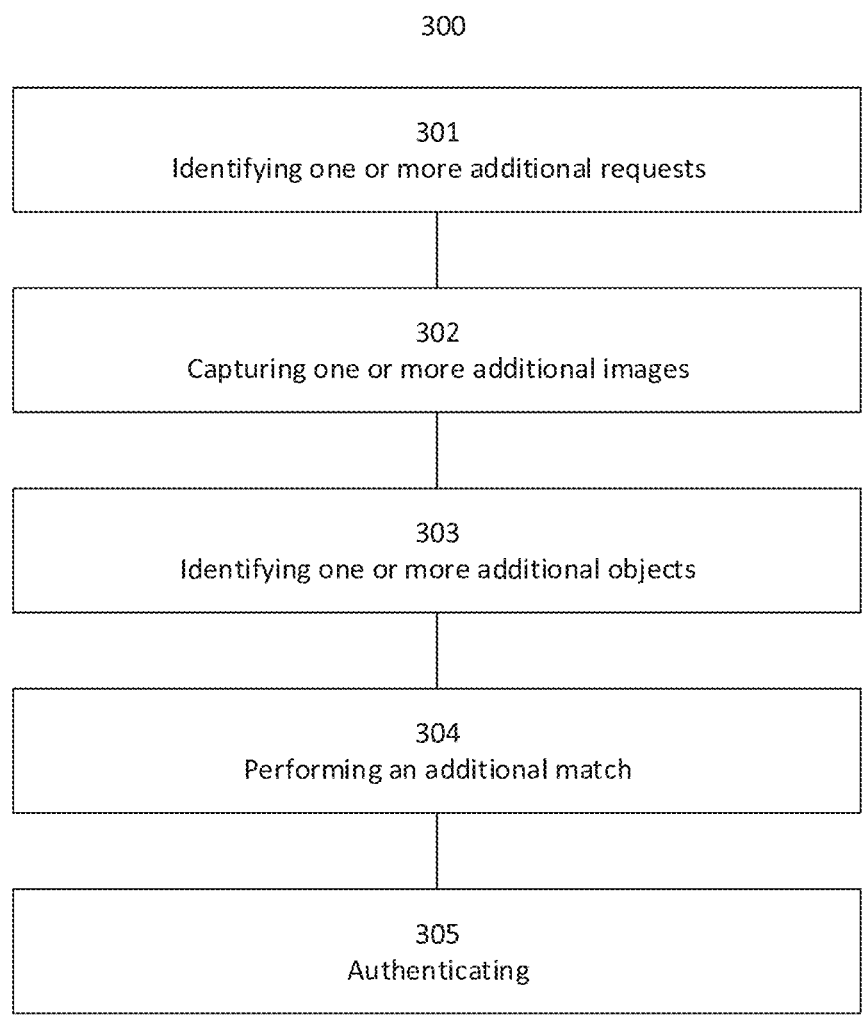
FIG. 3 is a flowchart schematically representing an optional flow of operations for continuous authentication, according to some embodiments of the present invention.

Reference is now also made to FIG. 3, showing a flowchart schematically representing an optional flow of operations 300 for continuous authentication, according to some embodiments of the present invention. In 301, the one or more hardware processor optionally identifies one or more additional requests of the user to access the restricted resource. Optionally, in 302 one or more additional images are captured at the location by the camera. In 303, the one or more hardware processor identifies one or more additional objects in the one or more additional images.

Optionally, the one or more hardware processor uses three-dimensional object recognition to identify the one or more additional objects in the one or more additional images. Now, in 304, the one or more hardware processor performs an additional match between the one or more additional objects and the predefined set of objects mapped by the three-dimensional model, and in 305 the additional request is authenticated based on an outcome of the additional match. Optionally, the continuous authentication is performed periodically, for example every several minutes or every hour.

In some embodiments, continuous authentication is performed by moving the camera or the one or more additional objects and capturing one or more images of the one or more additional objects after they have been moved. For example, when the one or more additional objects are a gadget, the gadget may be rotated around one or more three-dimensional axes to capture over time multiple sides of the gadget. Another example is when the one or more additional objects are a gadget, the gadget may be moved around the space of the location to capture over time the gadget at different locations of the space of the location. Another example is moving the camera to capture over time multiple different views of the location. Capturing over time different views of an object or a location reduces the risk of false authorizations by using a single captured image over and over, regardless of the user being at the location.

Figure 4:
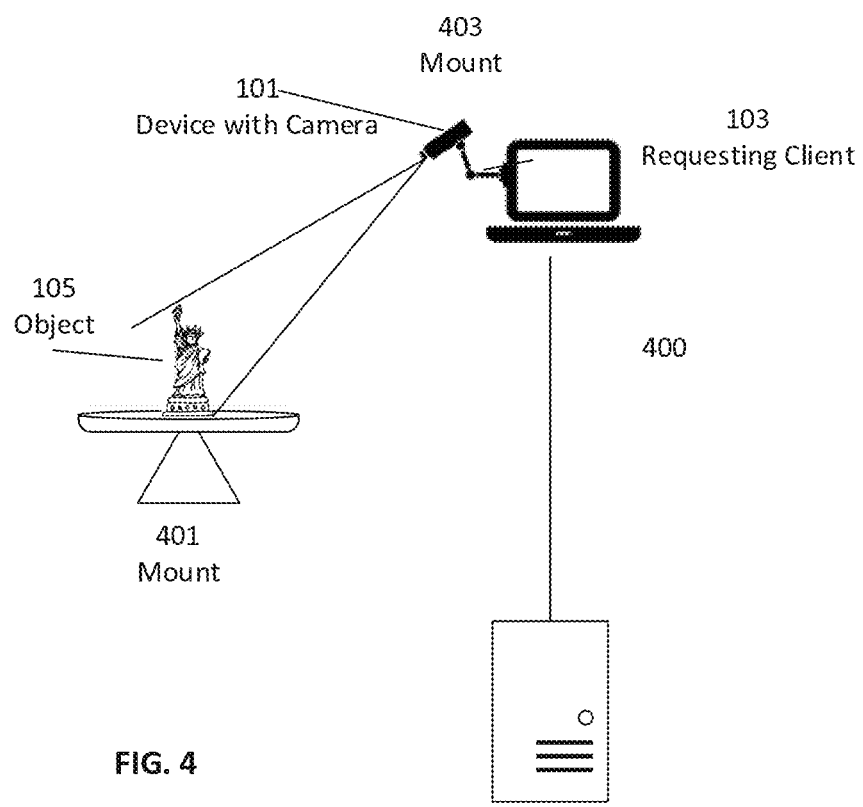
FIG. 4 is a schematic block diagram of another exemplary system according to some embodiments of the present invention.

Reference is now also made to FIG. 4, showing a schematic block diagram of another exemplary system 400 according to some embodiments of the present invention. Optionally, the user moves the camera or the one or more objects manually. For example, the user may move the camera within the location to point the camera at the one or more additional objects. Other examples are the user rotating the object in front of the camera, and the user placing the object in a predefined location in the space of the location. Optionally, the one or more hardware processor instructs the user to move the camera or the one or more objects. However, in some embodiments, system 400 comprises a controllable mount 401 or 403, having a moveable member. Optionally, the moveable member rotates. Optionally, the moveable member swivels. Optionally, the moveable member moves in multiple three-dimensional axes. For example, mount 401 has a rotating surface, and mount 403 has a moveable arm. The camera or the one or more additional objects may be mounted on the moveable member, and the one or more hardware processor may instruct the controllable mount to move the moveable member to move the mounted camera or one or more additional objects.

In embodiments where the mount has a rotating surface, object 105 may be mounted on the rotating surface of mount 401. Rotating the rotating surface may change an orientation between object 105 and the camera of client device 101. In embodiments where the mount has a moveable arm, the client device having the camera 101 may be mounted on the moveable arm of mount 403. Moving the moveable arm may change an orientation between object 105 and the camera of client device 101. Optionally, object 105 is an object characteristic of the user. Continuous identification at the location of the object characteristic of the user serves as proof the user is continuously at the location. Optionally, moving the moveable arm may change an orientation between the camera of client device 101 and the location. When the camera is of the user's client device, continuous identification of a plurality of objects at the location serves as proof the user is continuously at the location.

In the methods described above, authentication comprises using a predefined set of objects. Following is a possible method executed by the system to produce a set of objects for use as a security sequence when authenticating a request.

Figure 5:
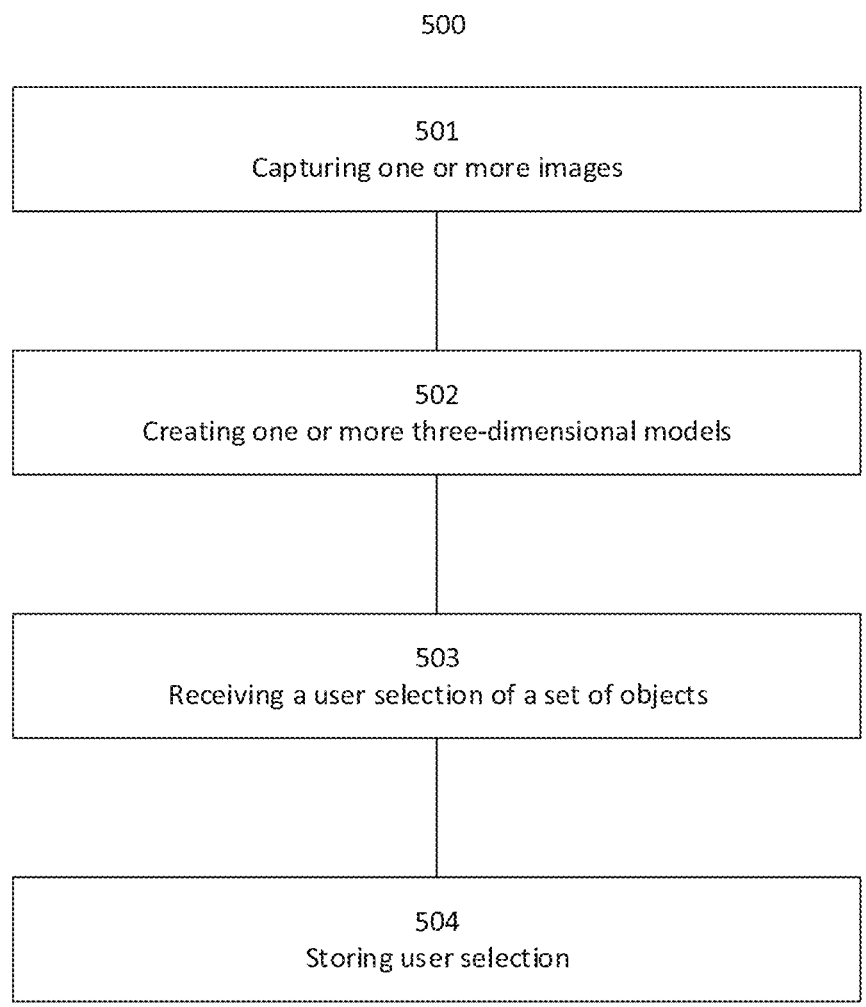
FIG. 5 is a flowchart schematically representing an optional flow of operations for producing a security sequence, according to some embodiments of the present invention.

Reference is now also made to FIG. 5, showing a flowchart schematically representing an optional flow of operations 500 for producing a security sequence, according to some embodiments of the present invention. In such embodiments, a camera captures 501 one or more images. One or more hardware processor creates 502 one or more three-dimensional models from the one or more images, geometrically mapping a plurality of objects. In 503, the one or more hardware processor optionally receives a user selection of a set of objects of the plurality of objects, and stores 504 the selection, for example in a non-volatile digital storage. Optionally, the one or more images are captured at a location, to produce a set of objects for authenticating the user at the location. When the one or more images are captured at the location, the three-dimensional model may geometrically map the plurality of objects around the location.

Figure 6:
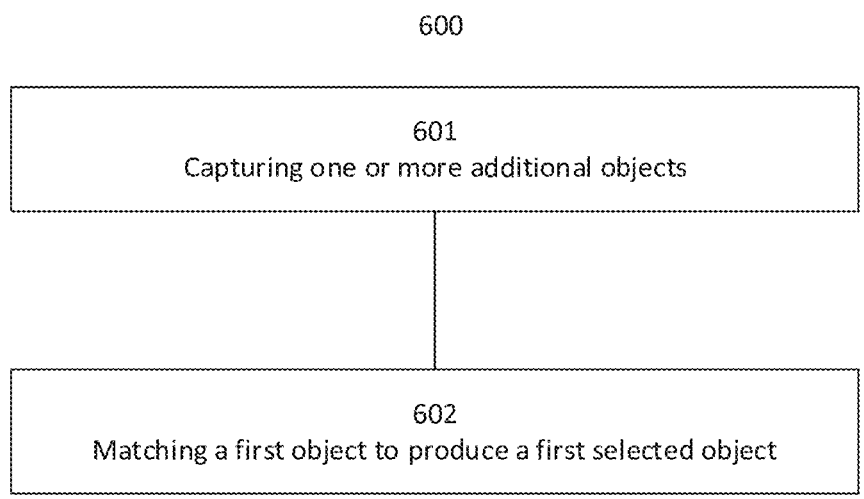
FIG. 6 is a flowchart schematically representing an optional flow of operations for selecting an object for a security sequence, according to some embodiments of the present invention.

In some embodiments, user selection of one or more objects is by capturing one or more images of the one or more objects. Reference is now also made to FIG. 6, showing a flowchart schematically representing an optional flow of operations 600 for selecting an object for a security sequence, according to some embodiments of the present invention. In such embodiments, the camera captures 601 one or more additional images and the one or more hardware processor matches 602 a first object in the one or more additional images with at least one of the plurality of objects mapped by the three-dimensional model, to produce a first selected object. In some embodiments, the set of selected objects is a sequence of selected objects. Optionally, this is repeated at least one more time to produce the sequence of objects: the camera captures one or more other images and the one or more hardware processor matches a second object in the one or more other images with at least one other object of the plurality of objects mapped by the three-dimensional model, to produce a second selected object. This allows the user to "point and select" objects—by pointing the camera at an object and capturing an image of the object the user selects the object to be included in the predefined set of objects used as a security sequence for authenticating the user at the location.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant three-dimensional object recognition methods will be developed and the scope of the term three-dimensional object recognition is intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A method for increasing security of access to one or more than one restricted resource by authentication of a location of a mobile client device based on image analysis, comprising:

an access defining stage including:
    capturing one or more first images of a plurality of three-dimensional physical structures located in and characterizing a physical environment secure for accessing the restricted resource;
    generating and storing one or more three-dimensional models extracted from the one or more first images, the three-dimensional models mapping positional orientations of the three-dimensional physical structures, the positional orientations identifying the secure physical environment; and
    associating each of the one or more three-dimensional models with:
        reference location data of one of the physical environment;
        reference view point data of the positional orientations; and
        the restricted resource; and
an access authorization stage including:
    identifying a request of a user to access the restricted resource from the mobile client device;
    receiving current location data and current view point data of a camera of the mobile client device;
    selecting from the stored plurality of three-dimensional models a three-dimensional model associated with the current location data and the current view point data;
    capturing one or more second images, of three-dimensional, inanimate, real objects, using the camera of said mobile client device;
    presenting said one or more second images on a display of said mobile client device; identifying a plurality of user selections, from the presented one or more second
    images, of one or more of the three-dimensional, inanimate, real objects;
    performing a match between each of said user selected three-dimensional, inanimate, real objects and the selected three-dimensional model associated with the current location data and the current view point data, said match conducted by three dimensional object recognition analysis using a feature-based geometric approach for confirming presence of the user at the secure physical environment based on an orientation of the user selected three-dimensional, inanimate, real objects;

authenticating said request based on an outcome of said match; and upon positive authentication of said request, authorizing said user to access said resource, and wherein the method further comprises performing continuous authentication comprising:

identifying at least one additional request of said user to access said resource;

upon the identifying of the additional request, capturing one or more third images by said camera;

identifying user selection of at least one additional three-dimensional, inanimate, real object in said one or more third images;

performing an additional match between said at least one additional three-dimensional, inanimate, real object and said three-dimensional physical structures using the selected three-dimensional model; and authenticating said at least one additional request based on an outcome of said additional match, and further comprising instructing moving said camera or moving said at least one additional three-dimensional, inanimate, real object to capture said one or more third images.

2. The method of claim 1, wherein the reference location data and the current location data are determined with respect to a reference object or with respect to a world coordinate system.

3. The method of claim 1, wherein:

the three-dimensional physical structures include a predefined sequence of physical, inanimate structures;

the three-dimensional, inanimate objects include a sequence of objects; and said match comprises matching said sequence of objects and said sequence of physical, inanimate structures.

4. The method of claim 1, wherein said identifying of said plurality of user selections includes receiving haptic input from said user via a tactile sensor installed over said display or by focusing said camera on at least one of the three-dimensional, inanimate objects.

5. The method of claim 1, wherein:

the three-dimensional physical structures include at least one inanimate user object characteristic of said user; or at least one of said three-dimensional physical structures is at a predefined orientation with reference to said camera.

6. The method of claim 3, wherein said user making said plurality of user selections comprises:

instructing said user to select a first of the three-dimensional physical structures;

receiving a user selection of said first three-dimensional physical structure; and instructing said user to select a second of the three-dimensional physical structures, upon confirmation of user selection of said first three-dimensional physical structure.

7. The method of claim 1, wherein said continuous authentication is performed periodically.

8. The method of claim 1, wherein said camera or said at least one additional three-dimensional, inanimate, real object is mounted on a movable member of a controllable mount; and wherein instructing moving said camera or moving said at least one additional three-dimensional, inanimate, real object comprises instructing said controllable mount to move said movable member to position said camera or said at least one additional real object.

9. The method of claim 1, wherein instructing moving said camera or moving said at least one additional three-dimensional, inanimate, real object is by instructing said user to manually move said camera or said at least one additional three-dimensional, inanimate, real object or by changing an orientation of said at least one additional real object relative to said camera or by changing a position of said at least one additional real object.

10. The method of claim 1, wherein said resource is at least one digital resource, or is a computer-controlled device or system.

11. A system for increasing security of access to one or more than one restricted resource by authentication of a location of a mobile client device based on image analysis, comprising at least one hardware processor configured to:

capture one or more first images of a plurality of three-dimensional physical structures located in and characterizing a physical environment secure for accessing the restricted resource;

generate and store one or more three-dimensional models extracted from the one or more first images, the three-dimensional models mapping positional orientations of the three-dimensional physical structures, the positional orientations identifying the secure physical environment; and associate each of the one or more three-dimensional models with:

reference location data of one of the physical environment;

reference view point data of the positional orientations; and the restricted resource; and identify a request of a user to access the restricted resource from the mobile client device;

receive current location data and current view point data of a camera of the mobile client device;

select from the stored plurality of three-dimensional models a three-dimensional model associated with the current location data and the current view point data;

capture one or more second images, of three-dimensional, inanimate, real objects, using the camera of said mobile client device;

present said one or more second images on a display of said mobile client device; identify a plurality of user selections, from the presented one or more second images, of one or more of the three-dimensional, inanimate, real objects;

perform a match between each of said user selected three-dimensional, inanimate, real objects and the selected three-dimensional model associated with the current location data and the current view point data, said match conducted by three dimensional object recognition analysis using a feature-based geometric approach for confirming presence of the user at the secure physical environment based on an orientation of the user selected three-dimensional, inanimate, real objects;

authenticate said request based on an outcome of said match; and upon positive authentication of said request, authorizing said user to access said resource, and wherein the hardware processor is further configured to perform continuous authentication comprising:

identify at least one additional request of said user to access said resource;

upon the identifying of the additional request, capturing one or more third images by said camera;

identify user selection of at least one additional three-dimensional, inanimate, real object in said one or more third images;

perform an additional match between said at least one additional three-dimensional, inanimate, real object and said three-dimensional physical structures using the selected three-dimensional model; and authenticate said at least one additional request based on an outcome of said additional match, and wherein the processor is configured to instruct moving said camera or moving said at least one additional three-dimensional, inanimate, real object to capture said one or more third images.

12. The system of claim 11, wherein said camera is electrically connected to said at least one hardware processor or is connected to said at least one hardware processor via a first digital communication network.

13. The system of claim 11, wherein said display is electrically connected to said at least one hardware processor.

14. The system of claim 11, further comprising a controllable mount having a movable member for mounting a camera or an object.

15. The system of claim 11, further comprising a non-volatile digital storage, connected to said at least one hardware processor;

wherein said non-volatile digital storage is electrically connected to said at least one hardware processor or is connected to said at least one hardware processor via a second digital communication network.

* * * * *